United States Patent Office 3,606,391
Patented Sept. 20, 1971

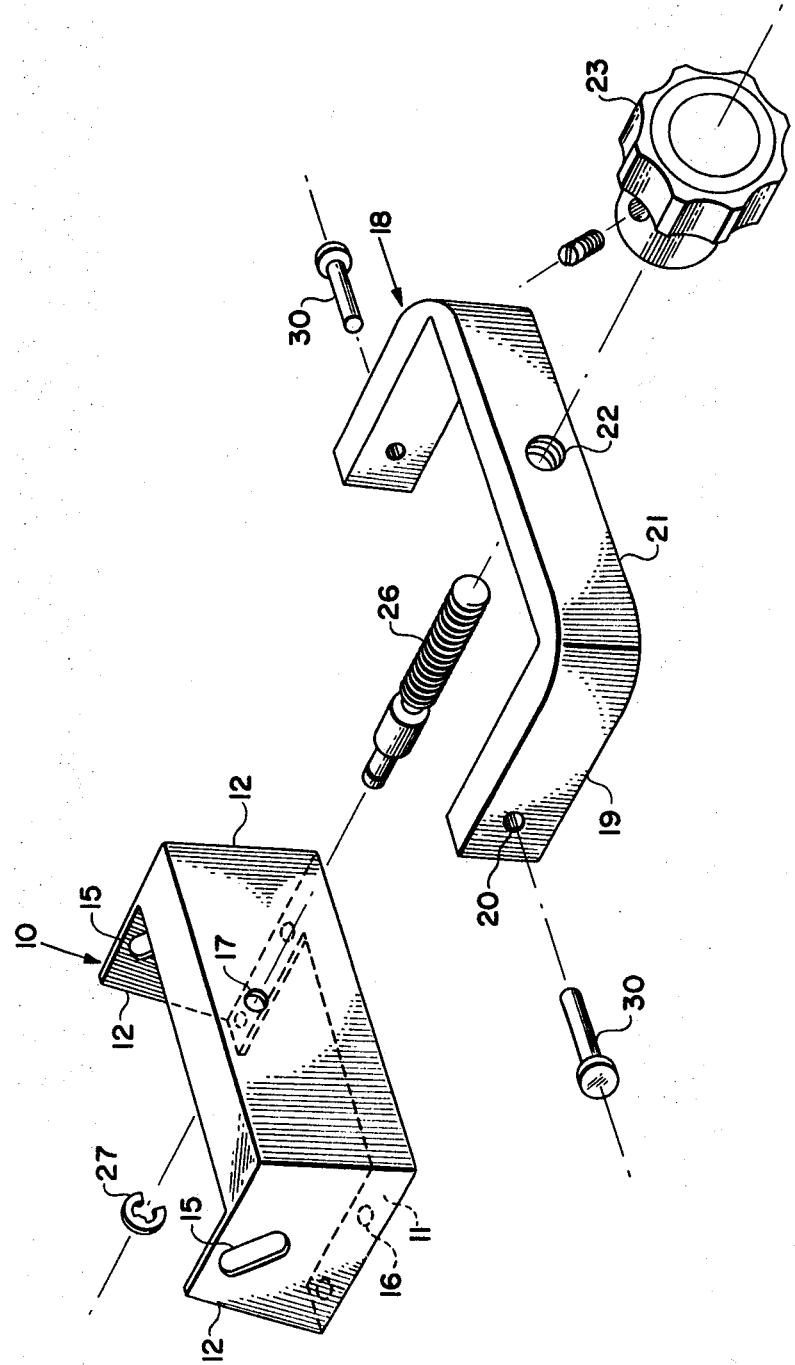

3,606,391
QUICK DISCONNECT CONDUIT CLAMP
John E. Sinnott, Richmond, Ontario, Canada, assignor to Northern Electric Company Limited, Montreal, Quebec, Canada
Filed June 24, 1970, Ser. No. 49,390
Int. Cl. F16l *23/00*
U.S. Cl. 285—38                                          7 Claims

ABSTRACT OF THE DISCLOSURE

A first clamp member has a bearing surface for engaging a clamping surface of one flange of a pair of mating flanges. The first clamp member also has two sides with each side having a slot therein that is positioned obliquely to the bearing surface. A second clamp member includes a pair of pins. Each pin passes through a corresponding slot. A screw drive is used to separate the two clamp members and in so doing causes the pins to slide down along the slots, clamping the pair of mating flanges between the pins and the bearing surface.

---

This invention relates to clamps, and more particularly, to clamps for quickly connecting and disconnecting flanged conduit sections without the use of tools.

The uses to which quickly connecting and disconnecting conduit clamps are put are similar in principle but may be considerably varied in application. One such application is that of clamping together flanged conduit sections which are used in conducting materials such as liquids, pulverized solids and the like.

A common use for quickly connecting and disconnecting conduit clamps is to clamp together sections of flanged waveguide in radio frequency applications. Waveguide is a name given to hollow tubes which form conduits for the transmission of electrical power and signals at microwave frequencies. To facilitate the construction of microwave transmission circuits, waveguides are commonly made in sections having flat-faced end flanges for coupling the sections together. Generally these sections are made from rigid metal but in some applications, a flexible form of construction is used. In both cases, end flanges are used for connection purposes.

Known examples of quick disconnect waveguide clamps may be seen in United States Patent 3,039,797 issued 19 June 1962 to J. T. Harper et al., United States Patent 3,153,548 issued Oct. 20, 1964 to E. R. Speakman, and Canadian Patent 545,031 issued Aug. 20, 1967 to J. W. Hamilton. It is expected that the clamps described in these patents are fairly representative of the state of the art. However, there still seem to be certain problems which are not fully solved by these clamps. For example, it may be seen from the teachings in these patents that there appears to be a certain awkwardness of use in applying the described waveguide clamps. Two of the clamps require the operation of dual clamp levers, while the third clamp requires a secure hand-grip on one locking member in order to twist-lock that member to a mating locking member. In restricted quarters, particularly where the waveguide is placed along a corner of a wall, the operation of the clamps may be extremely awkward. Another foreseeable problem with the structures taught by these patents is a difficulty which may be experienced when attempting to use waveguide clamps of this type with flanges having various degrees of thickness. Lastly, the problem of manufacturing complexity arises. It may be seen that two of the known waveguide clamps are complicated in their mechanical structure which would tend to keep their manufacturing cost high.

By means of the invention herein to be described, the foregoing problems have been largely overcome. These difficulties have been solved by a clamp for interconnecting conduit sections, having mating flanges with clamping surfaces, in which the clamp comprises: a flange member having a bearing surface for engagement with the clamping surface of one of the mating flanges, the flange member also having two sides, each with a slot disposed obliquely therein relative to the bearing surface. The clamp further comprises a lock member having a slot engagement means which is used to slideably engage the slots. And finally, the clamp includes an adjustable spacer means for changing the spacing between the said members whereby the slot engagement means are drawn along the slots and against the clamping surface of the other mating flange.

It had been earlier mentioned that one of the difficulties with the described prior art clamp structures is a certain awkwardness of use. This is eliminated in my clamp structure in view of an adjustable spaced means which is used to change the spacing between the clamping members in the clamp. It will be seen in the description to follow that this spacer means is a screw having a knob on one end. Thus, once the clamp is in position on the mated waveguide flanges, only finger movements, are required to bring the clamp members together so as to clamp together the waveguide flanges. Adaptability of my clamp to a wide range of flange thickness does not present a problem either. Merely by changing the length of the slots int he lock member, practically any desired thickness of waveguide flange may be accommodated. Finally, with regard to complexity of manufacture, it may be seen from the figures that the two illustrated embodiments of my invention comprise relatively simple components which may be purchased or readily manufactured.

Example embodiments of the invention herein described will be more readily understood by reference to the description which follows, taken in connection with the drawings in which:

FIG. 4 is an exploded isometric view of another embodiment of a quick disconnect conduit clamp.

Figure 1:
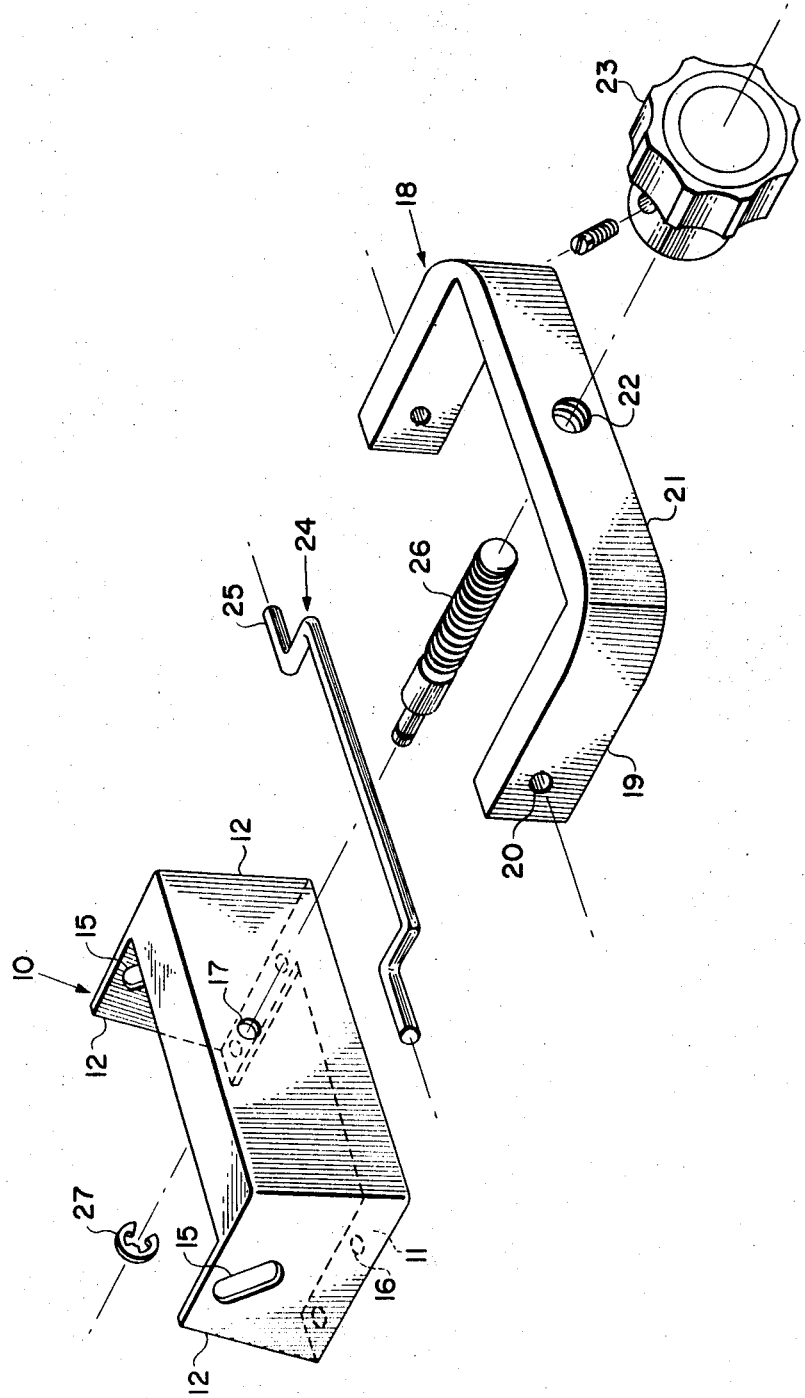
FIG. 1 is an exploded isometric view of one embodiment of a quick disconnect conduit clamp.
Figure 2:
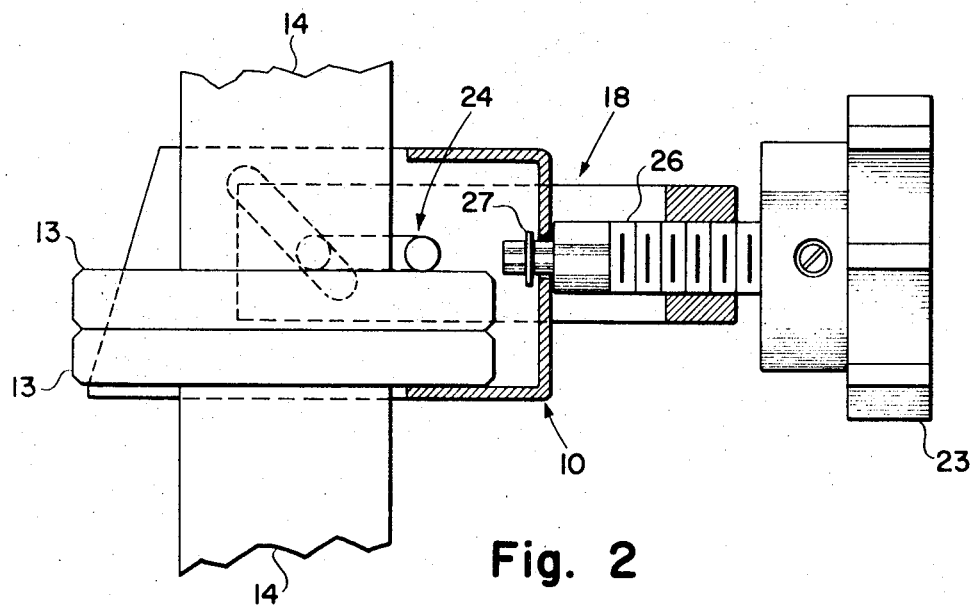
FIG. 2 is a side elevation view, in partial section, of the clamp of FIG. 1 shown clamping together two waveguide flanges.
Figure 3:
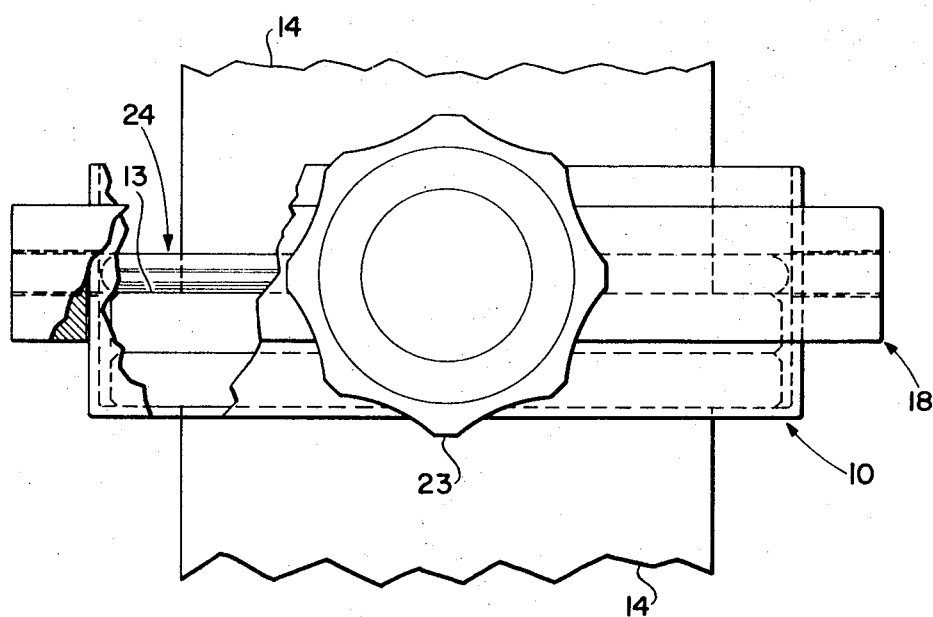
FIG. 3 is a front elevational view, showing a cut-away portion, of the clamp of FIG. 1 shown clamping together two waveguide flanges.

The clamp of FIG. 1 comprises a flange member 10 having sides 12 and a bearing surface 11 that is formed by a turned-in portion of the sides 12. It will be seen that the flange member 10 is shaped in the form of a U in order to engage a pair of mated flanges 13 of a waveguide 14 which is illustrated in FIGS. 2 and 3. The sides 12 have slots 15 formed therein which are disposed obliquely relative to the bearing surface 11. The bearing surface 11 has holes 16 which are bored therethrough in order that the flange member 10 may be fastened to one of the flanges 13 by means of machine screws which are not shown in the figures. The side 12 which joins together the two slot 15 containing sides 12 has a captive-hole 17. A lock member 18 is provided to engage the flange member 10 and includes two sides 19 which slideably engage the corresponding sides 12 of the flange member 10. In the complete assembly of the clamp unit illustrated in FIGS. 1, 2 and 3, the sides 12 and 19, which correspond, are engaged in a position which allows a pair of holes 20, that are located at the ends of the sides 19, to coincide with some portions of the slots 15. It is apparent from all of the figures illustrating this clamp structure that the flange member 10 and the lock member 18 are assembled together in a single plane. In the lock member 18, a third side 21 includes a threaded hole 22, which, when the flange member 10 and the lock member 18 are placed together, coincides with the captive-hole 17. The remaining structure of the clamp of FIG. 1 consists of a slot engagement means in the form of a rod member 24. This structural member comprises a metal rod formed into a U shape having its ends further formed into turned-out ends 25. Its function is to have each respective turned-out end 25 engage a corresponding slot 15 and a corresponding hole 20 so that when the lock member 18 is separated from the flange member 10, the turned out ends 23 are pulled down the slots 15 as a result of being anchored in the holes 20 of the lock member 18. Thus, the rod member 24 is forced down the slots 15 and against a clamping surface of one of the flanges 13 causing both flanges 13 to be trapped and clamped between the turned-out ends 25 and the bearing surface 11 as shown in FIGS. 2 and 3.

Separation of the lock member 18 from the flange member 10 occurs by means of a screw 26. It may be seen from FIGS. 1 and 2 that the screw 26 has one end which is not threaded and which is reduced in diameter so as to fit through the captive-hole 17 where it is retained by a C clip 27 which fits onto the reduced diameter end portion of the screw 26. The threaded portion of the screw 26 is screwed through the threaded hole 22. A knob 23 is affixed to the threaded end of the screw 26 to complete an entire and workable clamp assembly. Thus, in order to clamp together the flanges 13 of the waveguide 14, the screw 26 is rotated to force apart the lock member 18 from the flange member 10, and in so doing forces the turned-out ends 25 down the slots 15 and into clamping contact with a clamping surface of one of the flanges 13.

In the clamp structure of FIG. 4 the flange member 10, the lock member 18, the screw 26, the knob 23 and the C clip 27 may also be found. In this particular embodiment, the rod member 24 has been replaced with a pair of cylindrical pins 30. One end of each of the pins 30 fits through a corresponding hole 20 in the lock member 18 and may be fixed therein by welding or soldering. Aside from this change in structure, the remainder of the clamp remains the same as earlier described. Accordingly, the working action of the clamp is the same since the cylindrical pins 30 move down the slots 15 when the lock member 18 is separated from the flange member 10, and bear against a clamping surface of a waveguide flange 13 in the same manner as previously described.

It will be apparent to those skilled in the art that the clamp herein disclosed may be modified in structure but will continue to operate in substantially the same way. For example, the rod member 24, or the cylindrical pins 30 may be replaced by having the end portions of the sides 19 of the lock member 18 turned in and adapted to engage the slots 15. Furthermore, it should be added that the oblique angle of the slots 15 is not necessarily critical. Thus, the slots may be placed at a particular angle which will hasten the clamping action of the slot engagement means. This can be done readily by making the slots 15 approach more closely an angle perpendicular to the bearing surface 11. Conversely, a slower clamping action will occur by inclining the oblique slots 15 in the direction of the plane of the bearing surfaces 11. In the alternative, the speed of the clamping action may be varied by changing the pitch of the screw 26.

What is claimed is:
1. A clamp for interconnecting conduit sections having mating flanges with clamping surfaces, the clamp comprising:
   a flange member having a bearing surface for engaging the clamping surface of one of the mating flanges, and also having two sides, each with a slot therein disposed obliquely relative to the bearing surface;
   a lock member having slot engagement means for slideably engaging the said slots; and
   an adjustable spacer means for changing the spacing between the said members whereby the slot engagement means are drawn along the slots and against the clamping surface of the other mating flange.
2. A clamp as defined in claim 1 wherein the slot engagement means comprise integral extensions of the lock member.
3. A clamp as defined in claim 1 wherein the slot engagement means comprise two pivot pins, the one end of each pivot pin being fixed in the lock member.
4. A clamp as defined in claim 1 wherein the lock member has two holes in which the slot engagement means are loosely held, and the slot engagement means comprise a rod member having ends that protrude through a corresponding slot and hole, the rod member being adapted to loosely fit around the conduit sections.
5. A clamp as defined in claim 2 wherein the adjustable spacer means comprises a screw having a handle on one end, the screw body being rotatably screw engaged with the lock member and the other end of the screw being held rotatably captive to the flange member whereby the lock member is free to move along the axis of the screw relative to the flange member.
6. A clamp as defined in claim 3 wherein the adjustable spacer means comprises a screw having a handle on one end, the screw body being rotatably screw engaged with the lock member and the other end of the screw being held rotatably captive to the flange member whereby the lock member is free to move along the axis of the screw relative to the flange member.
7. A clamp as defined in claim 4 wherein the adjustable spacer means comprises a screw having a handle on one end, the screw body being rotatably screw engaged with the lock member and the other end of the screw being held rotatably captive to the flange member whereby the lock member is free to move along the axis of the screw relative to the flange member.

References Cited

UNITED STATES PATENTS

| 349,511 | 9/1886 | McKenzie | 285—406 |
| 1,890,061 | 12/1932 | Lefkowitz | 285—309 |
| 2,691,201 | 10/1954 | Matthews | 285—420X |

FOREIGN PATENTS

| 263,876 | 6/1964 | Netherlands | 285—364 |
| 1,188,390 | 3/1965 | Germany | 285—364 |
| 359,577 | 2/1962 | Switzerland | 285—364 |

THOMAS F. CALLAGHAN, Primary Examiner

U.S. Cl. X.R.

24—211L; 285—406, 420